INVENTORS
Clifton C. Jennings
William L. Lankford, Jr.
BY William S. Dorman
ATTORNEY INVENTORS
Clifton C. Jennings
William L. Lankford, Jr.
BY William S. Dorman
ATTORNEY

3,431,780
APPARATUS FOR DETERMINING DIFFERENCES IN ELEVATION

Clifton C. Jennings, Tulsa, and William L. Lankford, Jr., Oklahoma City, Okla., assignors to The Geolograph Company, Oklahoma City, Okla., a corporation of Oklahoma
Filed Aug. 4, 1966, Ser. No. 570,224
U.S. Cl. 73—316
Int. Cl. G01f 23/06
4 Claims

ABSTRACT OF THE DISCLOSURE

A method and apparatus for determining the difference in elevation between two relatively movable members which involves providing a first sealed liquid column of substantially constant volume connecting at its ends with said members, providing a second sealed gaseous column of substantially constant volume also connecting at its ends with said members, equalizing the pressures between the ends of the two columns at one of the members and measuring the difference of pressure between the other ends of the columns at the other of the two members thereby providing a measured difference which can be converted into a reading or indication representing the difference in elevation between the two members.

---

This invention relates to apparatus for determining differences in elevation, and more particularly, but not by way of limitation, to a pressure differential liquid level measuring device for facilitating the recording or determination of the liquid level in a tank, or the like.

There are many circumstances wherein it is desirable to accurately determine and/or record the level of a fluid in a container, and particularly a liquid contained in a tank, pit, or the like. For example, in the oil industry the level of the drilling mud in the mud pit is frequently used as an indication of the progress of the drilling operation.

The present invention contemplates a liquid level measuring device which is particularly designed and constructed in a manner requiring a minimum of mechanical linkages in order to produce accurate results in a simpler and more economical manner than heretofore possible. The invention, basically, involves a sealed column of liquid working against a sealed column of gas. The two columns both extend from one terminus, which will be referred to as the differential pressure transmitter, to a second terminus, which will be referred to as the measuring element. These two columns are completely isolated from each other, although they are allowed to equalize at the measuring element through the medium of a flexible diaphragm. At one terminus therefore, the two columns are individually fed into the opposite sides of a differential pressure transmitter which may be of any suitable conventional or well known type, such as electrical, pneumatic, or the like. The other terminus of the two columns is formed by two separate sealed chambers in a measuring element. The measuring element chambers are separated from each other by a flexible diaphragm whereby the pressures in the chambers are equalized. The measuring element is carried by float member, or the like, which fluctuates with the level of the liquid, and the fluid columns are maintained within flexible conduits which extend between the measuring element and the differential pressure transmitter. As the measuring element rises and falls with the liquid level the height of the fluid columns decreases and increases whereby a pressure differential is created on the opposite sides of the differential pressure transmitter, with the pressure differential being proportional to the liquid level. Of course, the pressure transmitter may be properly calibrated for operation of a suitable recording device, or the like, for reflecting the level of the liquid within the tank, pit, or other container.

It is an important object of this invention to provide a novel measuring device for determining and/or recording differences in elevation.

It is another object of this invention to provide a novel liquid level measuring device which is of a particularly simple construction and economical operation.

Other and further objects and advantageous features of the present invention will hereinafter more fully appear in connection with a detailed description of the drawings in which.

Figure 1:
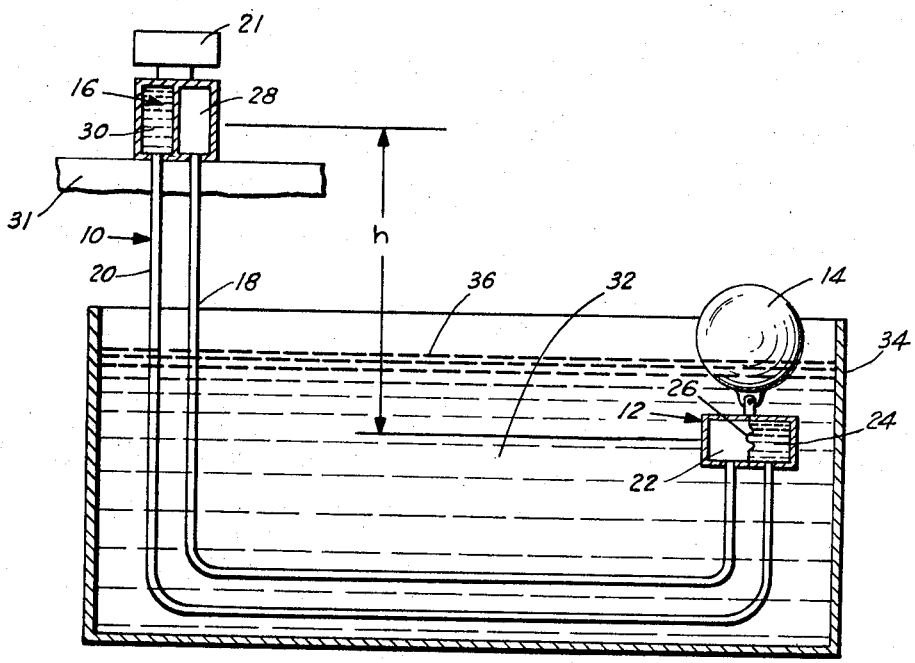
FIGURE 1 is a schematic side elevational view of a liquid measuring apparatus embodying the invention.

Referring to the drawings in detail, and particularly FIGURE 1, reference character 10 generally indicates a liquid level measuring device including a measuring element 12 carried by a float member 14 and connected to a conventional differential pressure transmitter 16 by a pair of conduits 18 and 20, as will be hereinafter set forth in detail; and a suitable indicating device 21, such as a recorder, signal means or the like, is preferably operably connected to the transmitter 16 for receiving signals therefrom. The conduits 18 and 20 are flexible whereby the ends thereof connected to the measuring element 12 may fluctuate therewith; however, it is to be understood that the conduits are stable with regard to volumetric content. In other words, the conduits are free to move or compensate for relative changes in height of the measuring device 12 with respect to the differential pressure transmitter 16, but are not expansible or compressible from a volumetric standpoint.

The measuring element 12 is provided with two separate internal sealed chambers 22 and 24 having a suitable flexible diaphragm 26, or the like, interposed therebetween whereby the pressures in the chambers 22 and 24 may be constantly equalized during operation of the device 10. The differential pressure transmitter 16 is normally provided with two separate sealed chambers 28 and 30 which are usually independent from each other whereby the internal pressure of one chamber is independent from the internal pressure of the other chamber. The conduit 18 extends between the chambers 22 and 28 to provide a first sealed fluid column, and the conduit 20 extends between the chambers 24 and 30 to provide a second sealed fluid column. The first fluid column is preferably filled with a gaseous fluid and sealed. It is to be noted that whereas substantially any suitable gas may be utilized, air at atmospheric pressure may be utilized to simplify the procedure. The second fluid column is preferably filled with a suitable liquid, as indicated in FIGURE 1, and sealed. Thus, the first fluid column becomes a sealed gas column and the second column becomes a sealed liquid column.

The differential pressure transmitter 16 is preferably rigidly or otherwise suitably mounted in a substantially stationary position, such as on the support 31 generally indicated in FIGURE 1. Of course, the support 31 may be of any suitable structure as available in accordance with the environment under which the invention is to be practiced. As hereinbefore set forth, the measuring element 12 is carried by the float 14 which, in turn, is disposed in a body of liquid 32 contained in a tank, pit, or other liquid container 34. As the level 36 of the liquid 32 rises and falls within the pit or containers 34, the float 14 rises and falls simultaneously therewith, as is well known. The measuring element 12 moves upward and downward or rises and falls within the liquid 32 simultaneously with the float 14. It will be apparent that the distance $h$ (which is the effective height of both the liquid column and gas column) will increase as the measuring element 12 falls within the liquid 32 and will decrease as the measuring element 12 rises within the liquid 32.

As hereinbefore set forth, the elevation of the measuring element 12 changes as the level 36 of the liquid 32 being measured changes, and the elevation of the differential pressure transmitter remains fixed. Thus, the distance $h$ between the differential pressure transmitter 16 and measuring element 12 changes with the liquid level. A pressure differential is produced or created between the chambers 28 and 30 as a result of the static head pressure difference between the chambers 24 and 30. Of course, the pressures in the chambers 22 and 24 are constantly equalized by the action of the diaphragm 26. The pressure differential in the chambers 28 and 30 is proportional to the difference in height or distance $h$, as will be shown by the following:

$P_1$ = pressure in chamber 30
$P_2$ = pressure in chamber 24
$P_3$ = pressure in chambers 22 and 28
$h$ = height in inches
$w$ = specific gravity of liquid in column
$P_2 = P_1 + hw$
$P_2 - P_1 = hw$
$P_2 = P_3$ (equalized by diaphragm 26)

Therefore, $P_3 - P_1 = hw$.

With $w$ remaining constant, we find that $P_3 - P_1$ is proportional to $h$.

Since $P_3 - P_1$ is the pressure differential between the chambers 28 and 30, then it will be readily apparent that the pressure differential in the differential pressure transmitter is proportional to $h$, which in turn is proportional to the level 36 of the liquid 32. Thus, the length of the connecting conduits 18 and 20, the density of the liquid medium filling the liquid column, and/or the range of the differential pressure transmitter 16 may be selected in order to obtain the desired calibrations and operating ranges for the measuring system in accordance with the recording apparatus (not shown) or the like to be utilized for providing a record or chart of the liquid level 36.

Figure 2:
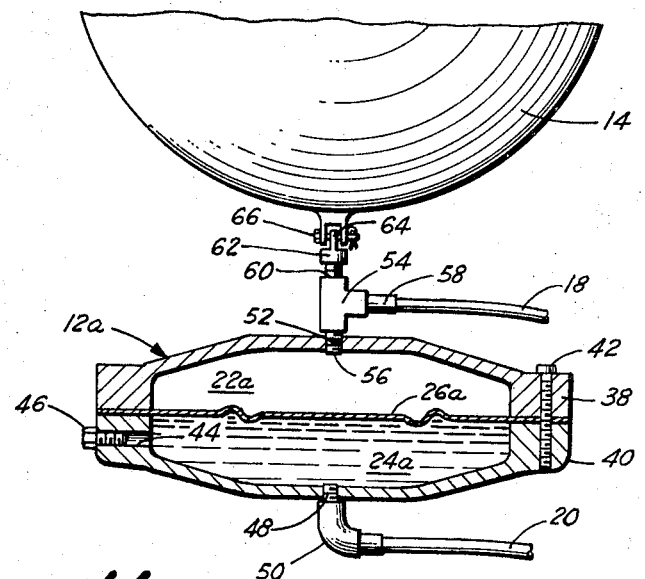
FIGURE 2 is a sectional view of a measuring element such as may be utilized in the practice of the invention.

Referring to FIGURE 2, a measuring element 12a is depicted therein which comprises a first housing section 38 secured to a second housing section 40 in any suitable manner, such as by a plurality of studs or bolts 42. A flexible diaphragm member 26a is interposed between the housing sections 38 and 40 and is securely clamped therebetween by the bolts 42, as is well known. The diaphragm 26a provides two sealed chambers 22a and 24a which correspond to the chambers 22 and 24, respectively, of the measuring element 12. The diaphragm 26a may be of any suitable type for constantly equalizing the pressure in the chambers 22a and 24a. An orifice or port 44 is provided in the housing section 40 for receiving a suitable plug fitting 46 therein. The filling liquid media may be injected or inserted into the chamber 24a through the open port 44, and the port 44 may be sealed by the plug member 46 subsequent to the filling operation, as is well known. Of course, the chamber 22a may be filled with a gaseous fluid, such as air at atmospheric pressure, in any well known manner (not shown).

The housing section 40 is further provided with a port 48 for receiving one end 50 of the conduit 20 and the housing section 38 is provided with a similar port 52 for receiving a fitting 54, or the like, therein. The fitting 54 may be of any suitable type and as depicted in FIGURE 2 is a T-fitting with one port 56 thereof open to the chamber 22a through the port 52 and a second port 58 thereof open to the interior of the conduit 18. The third port 60 is preferably closed by a suitable plug member 62 which is provided with an upwardly extending apertured flange 64 for receiving a pin 66 therethrough which may be utilized for connecting the measuring device 12a to the float 14.

Figure 3:
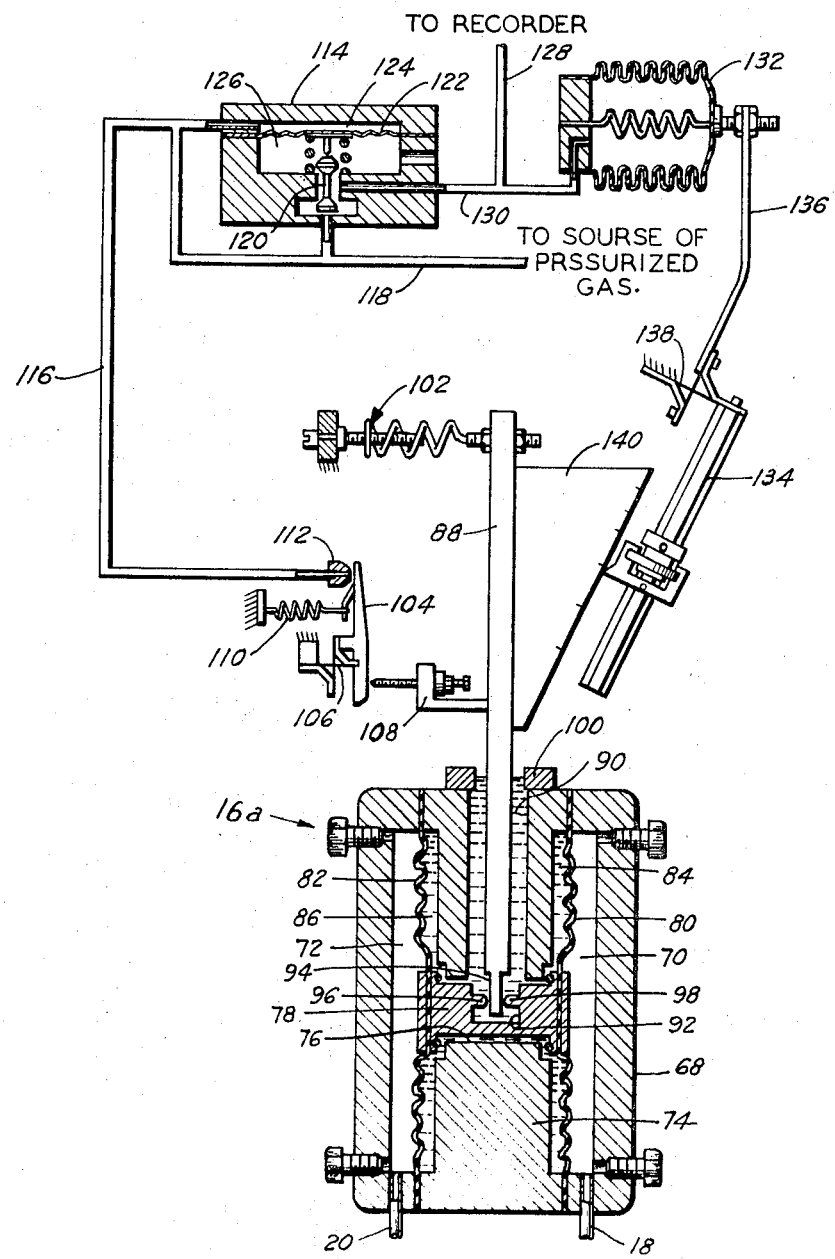
FIGURE 3 is a sectional view of a differential pressure transmitter such as may be utilized in connection with the invention.

Referring now to FIGURE 3, a differential pressure transmitter 16a is depicted therein which is of the type sold by Taylor Instrument Companies, and identified as Taylor Transcope Differential Pressure Transmitter 214T, as shown and described on pages 12 and 13 of the Taylor Instrument Companies brochure No. 2C103, Preliminary Issue. Whereas this particular transmitter structure, as such, forms no part of the present invention, nevertheless, it has been found that this type of transmitter will function efficiently; thus, transmitter 16a is merely illustrative of a transmitter which may be utilized in combination with the measuring element 12 (or 12a). Of course, any suitable type of differential pressure transmitter may be used such as electrical, pneumatic, or the like.

The differential pressure transmitter 16a comprises a housing 68 having a pair of oppositely disposed fluid chambers 70 and 72 separated by a central wall or baffle 74. A bore 76 extends transversely through the wall 74 for receiving a slidable spool member 78. The opposite ends of the spool 78 are carried by suitable diaphragm members 80 and 82 which are in turn suitably secured within the housing 68 for sealing the chambers 70 and 72 and defining fluid chambers 84 and 86 interposed between the wall 74 and the chambers 70 and 72, respectively. The chambers 84 and 86 are filled with a suitable liquid, as indicated in FIGURE 3 whereby changes in pressure within the chambers 70 and 72 will cause the diaphragms 80 and 82 to flex in a manner for reciprocating the spool 78 within the bore 76 for a purpose as will be hereinafter set forth. The chamber 70, which corresponds to the chamber 28 shown in FIGURE 1, is in communication with the chamber 22 through the conduit 18; and the chamber 72, which corresponds to the chamber 30 shown in FIGURE 1, is in communication with the chamber 24 through the conduit 20.

A force beam 88 extends through a central bore 90 provided in the wall 74 and into a bore 92 provided in the spool 78. The bore 90 is preferably filled with a liquid as indicated in FIGURE 3. The lower end of the beam 88 is reduced as shown at 94 and is disposed between a pair of spaced inwardly directed nodules 96 and 98. A suitable thrust pivot and seal member 100 is provided at the upper end of the bore 90 for sealing around the beam 88 and providing a pivot point therefor whereby movement of the spool 78 in one direction will pivot the beam 88 in a clockwise direction and movement of the spool 78 in an opposite direction will pivot the beam 88 in a counterclockwise direction. An adjustable spring urged connection member 102 is in engagement with the upper end of the force beam 88 for constantly urging the beam in a clockwise rotational direction about the pivot 100 as viewed in FIGURE 3.

A baffle member 104 is pivotally secured at 106 in the proximity of the force beam 88. An adjustable contact member 108 is carried by the beam 88 for engaging the baffle 104 on one side of the pivot point 106 and a spring member 110 is connected with the baffle 104 on the opposite side of the pivot 106 for constantly urging the baffle in a counterclockwise direction about the pivot 106 as viewed in the drawings. A nozzle member 112 is adapted for intermittent engagement by the baffle 104 and is in communication with a suitable relay valve 114 through a conduit 116. The valve 114 is preferably a pneumatic valve having one line 118 in communication with a suitable source of pressurized gas or air (not shown). A spring urged valve spool or relay capsule 120 is provided in the valve 114 and may be carried by a diaphragm 122 which separates the interior of the valve into two pressure chambers 124 and 126. An output line or conduit 128 is in communication with the interior of the valve 114 through a conduit 130 and extends to a recorder (not shown), gauge (not shown) or other indicator, for a purpose as will be hereinafter set forth. The line 130 also extends into communication with the interior of a follow-up bellows 132 which in turn is connected with a span adjustment lever 134 by means of a link arm 136 which is pivoted at 138. The span adjustment lever 134 is in engagement with a block 140 carried by the force beam 88.

As the differential pressure increases in the chambers 70 and 72, particularly when the pressure in the chamber 70 exceeds the pressure in the chamber 72, the spool 78 is moved in a left hand direction as viewed in the drawings and moves the lower end of the force beam 88 toward the left. This pivots the beam 88 in a clockwise direction about the pivot 100 and moves the contact member 108 away from the baffle 104 whereby the spring 110 tends to urge the baffle in a counterclockwise direction about the pivot 106. This decreases the nozzle-baffle gap which results in an increased nozzle back-pressure. This increased back-pressure increases the pressure in the chamber 124 and moves the relay capsule 120 downwardly, increasing the pressure in the follow-up bellows 132. The bellows 132, in turn, increases the force of the span adjustment lever 134 against the force beam 88 which tends to restore the baffle 104 to substantially the original position thereof. Of course, when the pressure differential between the chambers 70 and 72 is relatively large, the forces acting against the spool 78 and the beam 88 will be greater than when the pressure differential is relatively small. The pressure created by the forces acting on the beam 88 is transmitted to a suitable recorder or other indicating means, such as generally depicted at 21 in FIGURE 1, through the output conduit 128 in FIGURE 3. Thus, the pressure output to the recorder or indicating means will vary in accordance with the pressure differential in order that the signal given to the recorder will reflect the pressure differential. The recorder or indicating means provides a visual record or other type of indication in accordance with the signal received from the transmitter 16a for a purpose as will be hereinafter set forth.

As the liquid level 36 in FIGURE 1 rises within the vessel or other container 34, the float 14 rises therewith as is well known, and carries the measuring element 12 upwardly. Since the position of the transmitter 16 is fixed, the distance $h$ decreases in length and since the pressure differential between chambers 28 and 30 is directly proportional to the distance $h$, the pressure differential in the transmitter 16 will decrease. This decreased pressure differential will operate the transmitter for producing an output signal to the indicating means 21 for indicating the position of the liquid level 36. Conversely, as the liquid level 36 falls within the pit or container 34, the float 14 falls therewith and moves the measuring element 12 downwardly. The distance $h$ then increases, and the pressure differential between chambers 28 and 30 will increase. This increase in pressure differential will operate the transmitter for producing an output signal to the indicating means 21 for indicating the changed position of the measuring element. It will be apparent that the position of the measuring element will be constantly recorded or indicated at the indicating means to provide an indication of the level of the liquid 32. Of course, the length of the connecting hoses or conduits 18 and 20, the density of the liquid utilized for filling of the liquid column, and the range of the differential pressure transmitter may be selected or varied to obtain different calibrations and operating ranges for the system in accordance with the desired installation or output results.

From the foregoing it will be apparent that the present invention contemplates a novel liquid level measuring device for facilitating the recording or determination of the level of a body of liquid. The novel device comprises a sealed gas column working against a sealed liquid column wherein a measuring element is provided at one end of the sealed columns and a pressure differential transmitter is provided at the opposite ends of the fluid columns. The measuring element is floatingly disposed within the body and is provided with a pair of internal chambers having a diaphragm interposed therebetween for equalizing the pressures in the chambers whereby upward and downward fluctuation of the measuring element within the body of liquid creates a varying pressure differential in the pressure differential transmitter. The transmitter is thus actuated for providing an output signal which reflects the position of the measuring element (or in other words the level of the liquid). The output signal may be picked up or transmitted to a suitable indicating device for facilitating the determination of the liquid level. The novel liquid level measuring means is simple and efficient in operation and economical and durable in construction.

Whereas the present invention has been described in particular relation to a system for measuring and/or indicating changes in liquid level, it should be obvious that the apparatus disclosed and claimed herein could be used to indicate and/or record the difference in elevation between any two relatively movable members or locations, the transmitter element and the measuring element being connected to, or otherwise associated with, the two members or locations, respectively. In this regard, it should be mentioned that the measuring element could be generally stationary while the transmitter could be moved relative thereto; alternatively, both elements could be movable, with the measurement or indication representing the instantaneous relative difference in elevations between the two members or locations.

Changes may be made in the combination and arrangement of parts as heretofore set forth in the specification and shown in the drawings without departing from the spirit of the invention.

What is claimed is:

1. Apparatus for determining the difference in elevation between two relatively movable members comprising a measuring element associated with one of said members, a pressure differential transmitter associated with the other said members such that the difference in elevation between said measuring element and said pressure differential transmitter represents the difference in elevation between said two members, a first sealed liquid column of substantially constant volume extending between said measuring element and said transmitter, a second sealed gaseous column of substantially constant volume extending between said measuring element and said transmitter, means located at said measuring element for equalizing the pressures between said two columns at said measuring element, and means at said transmitter for measuring the difference in pressures between said two columns at said transmitter for providing a signal proportional to said difference in pressures.

2. Apparatus as set forth in claim 1 wherein the measuring element is provided with a pair of separate fluid chambers, one of said chambers constituting one end of the liquid column and the other of said chambers constituting one end of the gaseous column, said means for equalizing the pressures between said two column at said measuring element comprising a movable diaphragm interposed between said chambers.

3. Apparatus as set forth in claim 1 wherein one of said members is a stationary support upon which said transmitter is mounted, wherein the other of said members is a body of liquid whose level varies with respect to said support, and wherein said measuring element is carried by a float which is buoyantly supported by said body of liquid.

4. A method of determining the difference in elevation between two relatively movable members which comprises providing a first sealed liquid column of substantially constant volume connecting at its ends with said members, providing a second sealed gaseous column of substantially constant volume connecting at its ends with said members, equalizing the pressures between the ends of said columns at one of said members, and measuring the difference in pressure between the ends of said columns at the other of said members.

References Cited

UNITED STATES PATENTS

| | | | |
|---|---|---|---|
| 723,040 | 3/1903 | Schmitz | 73—316 |
| 2,674,128 | 4/1954 | Beam | 73—316 XR |
| 2,851,883 | 9/1958 | Quist | 73—316 |

FOREIGN PATENTS 844,671    7/1952    Germany.

LOUIS R. PRINCE, *Primary Examiner.*

DONALD O. WOODIEL, *Assistant Examiner.*